(12) United States Patent
Gilles (10) Patent No.: US 8,867,718 B2
(45) Date of Patent: *Oct. 21, 2014

(54) AUTOMATED ELECTRONIC TELECOMMUNICATIONS ORDER TRANSLATION AND PROCESSING

(71) Applicant: AT&T Intellectual Property I, L.P., Atlanta, GA (US)

(72) Inventor: Timothy Mark Gilles, Schaumburg, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,176

(22) Filed: Jun. 10, 2013

(65) Prior Publication Data

US 2013/0279674 A1    Oct. 24, 2013

Related U.S. Application Data

(63) Continuation of application No. 13/684,996, filed on Nov. 26, 2012, now Pat. No. 8,462,928, which is a (Continued)

(51) Int. Cl.
| | |
|---|---|
| *H04M 3/42* | (2006.01) |
| *G06Q 10/00* | (2012.01) |
| *G06Q 30/00* | (2012.01) |
| *G06Q 10/10* | (2012.01) |
| *G06Q 30/06* | (2012.01) |
| *H04M 3/51* | (2006.01) |
| *H04M 3/22* | (2006.01) |
| *H04M 7/12* | (2006.01) |

(52) U.S. Cl.
CPC ............ *H04M 3/42* (2013.01); *G06Q 10/1097* (2013.01); *G06Q 30/0601* (2013.01); *H04M 3/51* (2013.01); *H04M 3/42153* (2013.01); *H04M 3/22* (2013.01); *H04M 2203/105* (2013.01); *H04M 7/12* (2013.01); *H04M 3/42144* (2013.01); *G06Q 30/0635* (2013.01)
USPC ........... 379/201.01; 379/201.05; 379/201.12; 705/1.1; 705/26.81

(58) Field of Classification Search
USPC .................. 379/88.17, 93.01, 93.12, 201.01, 379/201.03, 201.12, 243, 245; 705/1.1, 705/26.1, 26.81, 26.82
See application file for complete search history.

(56) References Cited

U.S. PATENT DOCUMENTS

| | | | |
|---|---|---|---|
| 4,232,199 | A | 11/1980 | Boatwright et al. |
| 4,782,519 | A | 11/1988 | Patel et al. |

(Continued)

OTHER PUBLICATIONS

Swaminathan et al., How Carriers can Implement Electronic Interfaces to OSS and Service-Management Systems, America's Network, 4 pages, Jul. 1, 1997.

(Continued)

*Primary Examiner* — Harry S Hong
(74) *Attorney, Agent, or Firm* — Hartman & Citrin LLC (57) ABSTRACT

Systems and method for processing orders for telecommunications services are disclosed. Generally a telecommunications transaction set of an electronic data interchange standard is received, the telecommunications transaction set corresponding to a telecommunications product or service for a customer. An order for the telecommunications product or service is then generated based on processing of the telecommunications transaction set.

20 Claims, 7 Drawing Sheets

Related U.S. Application Data continuation of application No. 13/211,780, filed on Aug. 17, 2011, now Pat. No. 8,320,544, which is a continuation of application No. 12/630,196, filed on Dec. 3, 2009, now Pat. No. 8,023,631, which is a continuation of application No. 12/166,853, filed on Jul. 2, 2008, now Pat. No. 7,649,986, which is a continuation of application No. 11/712,671, filed on Mar. 1, 2007, now Pat. No. 7,406,163, which is a continuation of application No. 11/089,105, filed on Mar. 24, 2005, now Pat. No. 7,206,396, which is a continuation of application No. 10/663,942, filed on Sep. 16, 2003, now Pat. No. 6,907,117, which is a continuation of application No. 09/621,018, filed on Jul. 21, 2000, now Pat. No. 6,647,105, which is a continuation of application No. 09/056,023, filed on Apr. 6, 1998, now Pat. No. 6,137,873.

(56) References Cited

U.S. PATENT DOCUMENTS

| | | | |
|---|---|---|---|
| 4,951,196 | A | 8/1990 | Jackson |
| 5,012,511 | A | 4/1991 | Hanle et al. |
| 5,086,461 | A | 2/1992 | Thorn et al. |
| 5,222,125 | A | 6/1993 | Creswel et al. |
| 5,283,887 | A | 2/1994 | Zachery |
| 5,416,833 | A | 5/1995 | Harper et al. |
| 5,491,742 | A | 2/1996 | Harper et al. |
| 5,528,677 | A | 6/1996 | Butler et al. |
| 5,557,780 | A | 9/1996 | Edwards et al. |
| 5,644,619 | A | 7/1997 | Farris et al. |
| 5,687,224 | A | 11/1997 | Alley, Jr. et al. |
| 5,751,802 | A | 5/1998 | Carr et al. |
| 5,794,206 | A | 8/1998 | Wilkinson et al. |
| 5,794,234 | A | 8/1998 | Church et al. |
| 5,870,394 | A | 2/1999 | Oprea |
| 5,881,131 | A | 3/1999 | Farris et al. |
| 5,883,946 | A | 3/1999 | Beck et al. |
| 5,920,846 | A | 7/1999 | Storch et al. |
| 6,002,758 | A | 12/1999 | Ely et al. |
| 6,018,570 | A | 1/2000 | Matison |
| 6,061,439 | A | 5/2000 | Bleile et al. |
| 6,104,798 | A | 8/2000 | Lickiss et al. |
| 6,104,999 | A | 8/2000 | Gilles et al. |
| 6,137,873 | A | 10/2000 | Gilles |
| 6,144,848 | A | 11/2000 | Walsh et al. |
| 6,249,578 | B1 | 6/2001 | Gilles et al. |
| 6,269,399 | B1 | 7/2001 | Dyson et al. |
| 6,289,010 | B1 | 9/2001 | Voit et al. |
| 6,292,481 | B1 | 9/2001 | Voit et al. |
| 6,295,292 | B1 | 9/2001 | Voit et al. |
| 6,411,935 | B1 | 6/2002 | Gilles et al. |
| 6,487,285 | B2 | 11/2002 | Gilles et al. |
| 6,647,105 | B1 | 11/2003 | Gilles et al. |
| 6,681,007 | B2 | 1/2004 | Gilles et al. |
| 6,907,117 | B2 | 6/2005 | Gilles |
| 7,206,396 | B2 | 4/2007 | Gilles |
| 7,406,163 | B2 | 7/2008 | Gilles |
| 7,649,986 | B2 | 1/2010 | Gilles |
| 8,023,631 | B2 | 9/2011 | Gilles |
| 8,320,544 | B2 | 11/2012 | Gilles |
| 8,462,928 | B2 * | 6/2013 | Gilles .................. 379/201.01 |
| 2003/0139960 | A1 | 7/2003 | Nishikawa et al. |
| 2003/0139996 | A1 | 7/2003 | D'Antoni et al. |

OTHER PUBLICATIONS

Winter et al., "Escaping the Paper Trap-Electronic Billing Solutions can Ease the Invoicing and Collections Process", Wireless Review, 6 pages, May 1, 1998.

Gale Group Newsletter, "Companies Edging Toward Electronic Commerce", The Gale Group, 5 pages, Sep. 4, 1995 (abstract).
Gale Group Newsletter, "Pacific Bell Tests EDI Transmission of Telephone Bill (Electronic Data Interchange)", The Gale Group, 1 page, May 6, 1991 (abstract).
Business Wire, "Texas Instruments and Bel/South Announce Agreement to Extend EDI Products and Services to Telecommunications Customers", Business Wire, May 6, 1991 (abstract).
Gale Group Newswire, "Sprint Revolutionizes Business-To-Business Commerce With New Internet Application at Super Bowl XXXI", The Gale Group, Jan. 15, 1997 (abstract).
U.S. Office Action dated Apr. 28, 1999 in U.S. Appl. No. 09/056,023.
U.S. Office Action dated Oct. 12, 1999 in U.S. Appl. No. 09/056,023.
U.S. Notice of Allowance dated Apr. 26, 2000 in U.S. Appl. No. 09/056,023.
U.S. Office Action dated Jan. 7, 2003 in U.S. Appl. No. 09/621,018.
U.S. Notice of Allowance dated Jun. 17, 2003 in U.S. Appl. No. 09/621,018.
U.S. Office Action dated Sep. 9, 2004 in U.S. Appl. No. 10/663,942.
U.S. Notice of Allowance dated Feb. 10, 2005 in U.S. Appl. No. 10/663,942.
U.S. Office Action dated Jul. 14, 2006 in U.S. Appl. No. 11/089,105.
U.S. Notice of Allowance dated Dec. 20, 2006 in U.S. Appl. No. 11/089,105.
U.S. Office Action dated Sep. 12, 2007 in U.S. Appl. No. 11/712,671.
U.S. Office Action dated Apr. 2, 2008 in U.S. Appl. No. 11/712,671.
U.S. Office Action dated Nov. 26, 2008 in U.S. Appl. No. 12/166,853.
U.S. Office Action dated May 5, 2009 in U.S. Appl. No. 12/166,853.
U.S. Notice of Allowance dated Nov. 16, 2009 in U.S. Appl. No. 12/166,853.
U.S. Office Action dated Feb. 25, 2010 in U.S. Appl. No. 12/630,196.
U.S. Office Action dated Jul. 21, 2010 in U.S. Appl. No. 12/630,196.
U.S. Office Action dated Dec. 29, 2010 in U.S. Appl. No. 12/630,196.
U.S. Notice of Allowance dated May 17, 2011 in U.S. Appl. No. 12/630,196.
U.S. Office Action dated Oct. 6, 2011 in U.S. Appl. No. 13/211,780.
U.S. Office Action dated Apr. 3, 2012 in U.S. Appl. No. 13/211,780.
U.S. Notice of Allowance dated Aug. 6, 2012 in U.S. Appl. No. 13/211,780.
U.S. Notice of Allowance dated Feb. 14, 2013 in U.S. Appl. No. 13/684,996.
U.S. Appl. No. 10/126,923 Notice of Allowance dated Oct. 22, 2004.
U.S. Appl. No. 10/126,923 Office Action dated May 21, 2004.
U.S. Appl. No. 10/996,790 Notice of Allowance dated Nov. 4, 2005.
U.S. Appl. No. 10/996,790 Office Action dated Jul. 1, 2005.
U.S. Appl. No. 11/335,273 Notice of Allowance dated Jul. 14, 2008.
U.S. Appl. No. 11/335,273 Office Action dated Jan. 31, 2008.
U.S. Appl. No. 12/269,339 Notice of Allowance dated Nov. 4, 2011.
U.S. Appl. No. 12/269,339 Office Action dated Jul. 26, 2011.
U.S. Appl. No. 10/727,323 Notice of Allowance dated Feb. 10, 2005.
U.S. Appl. No. 11/088,360 Supplemental Notice of Allowability dated Aug. 6, 2007.
U.S. Appl. No. 11/088,360 Notice of Allowance dated Jun. 15, 2007.
U.S. Appl. No. 11/088,360 Office Action dated Jan. 16, 2007.
U.S. Appl. No. 09/055,846 Office Action dated Jun. 4, 1999.
U.S. Appl. No. 09/055,846 Notice of Allowance dated Feb. 9, 2000.
U.S. Appl. No. 09/563,319 Office Action dated Oct. 2, 2001.
U.S. Appl. No. 09/563,319 Notice of Allowance dated Jan. 24, 2002.
International Application No. PCT/US99/04215 International Search Report dated Jun. 15, 1999.
U.S. Appl. No. 09/056,001 Notice of Allowance dated Dec. 5, 2000.
U.S. Appl. No. 09/056,001 Office Action dated Jun. 30, 2000.
U.S. Appl. No. 09/056,001 Office Action dated Sep. 20, 2000.
U.S. Appl. No. 10/251,332 Notice of Allowance dated Sep. 8, 2003.
U.S. Appl. No. 10/251,332 Office Action dated May 1, 2003.
U.S. Appl. No. 09/798,576 Notice of Allowance dated Jul. 2, 2002.
U.S. Appl. No. 09/798,576 Office Action dated Mar. 7, 2002.
U.S. Appl. No. 09/798,576 Office Action dated Oct. 22, 2001.

* cited by examiner

AUTOMATED ELECTRONIC TELECOMMUNICATIONS ORDER TRANSLATION AND PROCESSING

RELATED APPLICATIONS

The present application is a continuation of U.S. patent application Ser. No. 13/684,996 (now U.S. Pat. No. 8,462,928) filed Nov. 26, 2012, which is a continuation of U.S. patent application Ser. No. 13/211,780 (now U.S. Pat. No. 8,320,544) filed Aug. 17, 2011, which is a continuation of U.S. patent application Ser. No. 12/630,196 (now U.S. Pat. No. 8,023,631) filed Dec. 3, 2009, which is a continuation of U.S. patent application Ser. No. 12/166,853 (now U.S. Pat. No. 7,649,986), filed Jul. 2, 2008, which is a continuation of U.S. patent application Ser. No. 11/712,671 (now U.S. Pat. No. 7,406,163), filed Mar. 1, 2007, which is a continuation of U.S. patent application Ser. No. 11/089,105 (now U.S. Pat. No. 7,206,396), filed Mar. 24, 2005, which is a continuation of U.S. patent application Ser. No. 10/663,942 (now U.S. Pat. No. 6,907,117), filed Sep. 16, 2003, which is a continuation of U.S. patent application Ser. No. 09/621,018 (now U.S. Pat. No. 6,647,105), filed Jul. 21, 2000, which is a continuation of U.S. patent application Serial No. 09/056,023 (now U.S. Pat. No. 6,137,873), filed Apr. 6, 1998, the entirety of each of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to electronic ordering of telecommunications services and products.

BACKGROUND

Businesses of all sizes rely on computers and communication systems now more than ever before. However, the widespread use of computers has not brought about the paperless office anticipated by the visionaries of the 1970s. Electronic Data Interchange (EDI) has been developed to provide a standard format for exchanging basic business data among firms that regularly conduct business with one another. EDI may be used to replace a wide variety of common business forms including purchase orders, invoices, shipping and packing slips, and numerous others, to eliminate costs associated with handling paper documents resulting in more efficient utilization of resources and increased accuracy.

The structure and content of electronic documents are defined by transaction sets. Similar to their physical counterparts, standard transaction sets include line items, referred to as data segments, and specific items, referred to as data elements. For example, data elements in an invoice might include quantity, product identification, unit price, and extended price. Hundreds of approved (standardized) transaction sets have been published by standards committees for various industries.

Telecommunications services and products are currently ordered from wholesalers primarily in a manual fashion, either by voice contact or exchange of paper forms. Where electronic methods are in use, they are generally batch-oriented, form-based file exchange processes, or utilize proprietary interfaces which may include Internet browser technology, for example. While some telecommunication companies have implemented EDI ordering systems, these systems typically require manual intervention to enter received EDI orders into the company's internal order system. Although EDI has been proposed for ordering of telecommunication products and services for several years, there has not yet been a significant implementation of EDI for this purpose.

Telephone Local Exchange Carriers (LEC) are now required to provide some type of system and method for Telecommunications Carriers to electronically place orders with an LEC for wholesale bundled exchange products and/or services in addition to unbundled elements of the telecommunications network. The various LECs have developed differing solutions such as providing direct access to their internal ordering systems, creating Internet browser forms for order entry, or creating proprietary application-to-application interface protocols.

The various objects, advantages, and features of the present invention will be readily apparent from the following detailed description of the best mode for carrying out the invention when taken in connection with the accompanying drawings.

DETAILED DESCRIPTION OF THE DRAWINGS

Automated electronic processing of orders for telecommunications products and services according to the present invention minimizes or eliminates human intervention to reduce or eliminate costs associated with handling paper documents. The present invention provides a real-time, interactive interface for telecommunications resellers to increase accuracy and reduce turn-around time. The development of transaction sets particularly suited for telecommunications services and products provides a standard method for electronic ordering where external access to dynamic data is required. Automated translation to and from unique or proprietary interfaces used by individual resellers to standard transaction sets further reduces manual intervention while providing increased flexibility for telecommunication product/services resellers.

Figure 1:
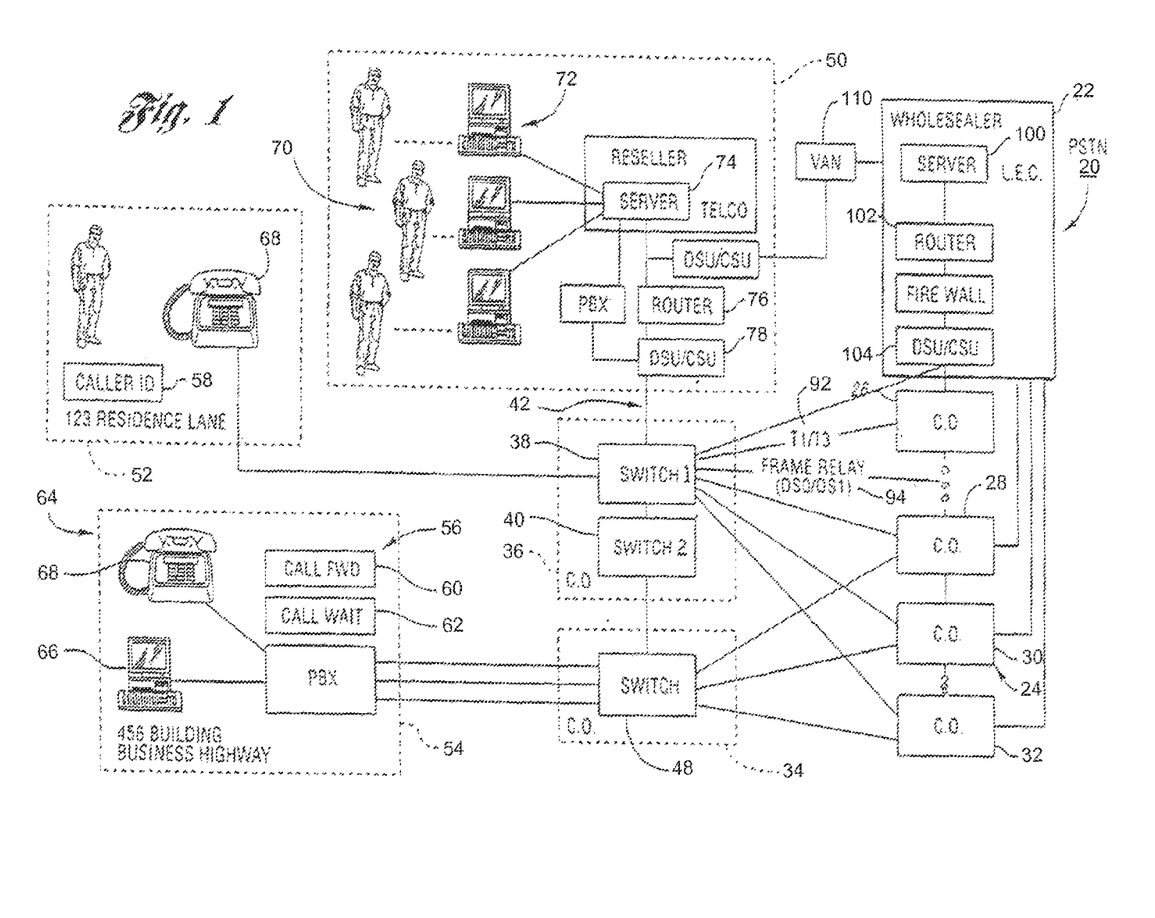
FIG. 1 is a diagram illustrating a Public Switched Telephone Network (PSTN) for application of automated electronic telecommunications product/service ordering according to the present invention.

FIG. 1 is a diagram illustrating a Public Switched Telephone Network (PSTN) for application of automated electronic telecommunications product/service ordering according to the present invention. The PSTN, indicated generally by reference numeral 20, includes a number of Local Exchange Carriers (LEC), such as LEC 22, which function as wholesalers for telecommunication products and services. Each LEC 22 owns and/or manages one or more Central Offices (CO), indicated generally by reference numeral 24, such as Central Offices 26-36. As is known, each CO 24 typically serves a particular geographic area and includes various hardware and software to deliver telecommunication services. Such hardware includes one or more switches 38, 40 to provide a communication path for a telephone call. The various COs 24 are typically connected using one or more circuits 42 which are classified based on bandwidth capability, signal protocol, or the like, as also well known in the art.

A telecommunications reseller 50 interfaces with end users or customers 52, 54 to provide various retail telecommunications products and services 56 such as caller ID 58, remote access call forwarding 60, and call waiting 62, for example. Reseller 50 provides the customer service functions including invoicing, collections, service inquiries, new telephone numbers, directory listings, and the like. Each customer 52, 54 may have one or more telecommunications devices 64 such as a computer 66 or telephone 68, sometimes referred to as premises equipment (PE). Customers typically include both residential customers, such as customer 52, and business or commercial customers, such as customer 54. Business customer 54 may have a Private Branch exchange (PBX) which interfaces with a switch such as switch 48 in the local CO 34. The PBX provides connections between and among internal PE in addition to coordinating access to external lines (circuits).

To provide prompt and efficient customer support, reseller 50 preferably utilizes automated electronic ordering according to the present invention to provide telecommunications products/services 56 to customers 52, 54. Reseller 50 employs customer service agents 70 which process requests from customers 52, 54 relative to telecommunications products and services. Customer service agents 70 preferably utilize one or more computers 72 to enter information received from customers 52, 54 which is then communicated to a message server 74 which performs two primary functions. Message server 74 manages communications between itself and computers (clients) 72 while also providing a single access point for communication with telecommunications wholesaler 22. Message server 74 communicates with a router 76 which preferably permits only messages conforming to the Transmission Control Protocol/Internet Protocol (TCP/IP) between reseller 50 and wholesaler 22. Router 76 communicates with DSU/CSU (Digital Service Unit/Customer Service Unit) 78 to facilitate digital communications. Depending upon the particular bandwidth requirement of reseller 50, i.e., the quantity, complexity, and frequency of transactions between reseller 50 and wholesaler 22, a particular class of circuit 42 is selected and installed. This may include DS0 (Digital Service Level 0-56 Kbps)/DS1 (Digital Service Level 1-1.5 Mbps) 90, T1 92, frame relay 94, or the like.

Wholesaler 22 includes similar equipment such as a message server 100, router 102, and DSU/CSU 104. Messaging between reseller 50 and wholesaler 22 is preferably accomplished using a dedicated connection which may be facilitated by one or more of the circuits described above. In an alternative embodiment, reseller 50 may communicate with wholesaler 22 via a Value Added Network (VAN) provider 110 operated by a third party. Preferably, messaging between server 100 of wholesaler 22 and server 74 of reseller 50 is performed using a simple character protocol, such as the Enterprise Access Protocol (EAP). In a preferred embodiment, EAP commands are sent from the server 74 of reseller 50 to server 100 of wholesaler 22 over a TCP/IP socket connection. The EAP commands are used to establish an application session to exchange electronic information between reseller 50 and wholesaler 22. Each message preferably includes a sender's reference (SNRF) which is generated by reseller 50 and used for routing purposes. This facilitates the distribution of messages by server 74 to customer service agents 70 via computers 72. In a preferred embodiment, the SNRF contains a unique identification code in the first six characters corresponding to a particular reseller 50. The last six characters of the SNRF are reserved for assignment by reseller 50 to uniquely identify a particular customer service agent 70 or computer 72. This enables reseller 50 to appropriately route messages received from wholesaler 22 through message server 74.

Preferably, each message server 74 which interacts with message server 100 of wholesaler 22 has a unique identification and password. To improve configuration flexibility, in one embodiment of the present invention, passwords are required only at the start of a particular session and are not required for each transaction set or electronic document exchanged. Also preferably, a packet filter firewall is used which permits only packets destined for a correctly defined static IP address and service port to further improve security. The connection established between reseller 50 and wholesaler 22 may be used to transfer files in addition to the defined transaction sets as described in greater detail below.

Functional descriptions for representative transaction sets applicable to automated electronic telecommunications ordering according to the present invention are set forth in Table 1 below.

TABLE 1

Telecommunications Transaction Sets

| Transaction Set | Description |
| --- | --- |
| 836 | Reseller notification (Contract Awarded) |
| 850 | Purchase order |
| 855 | Purchaser order acknowledgment |
| 860 | Buyer initiated purchaser order change request |
| 864 | Text message |
| 865 | Purchase order status |
| 870 | Reseller order status |
| 997 | Functional acknowledgment |

Preferably, all transaction sets are approved by a recognized standards organization such as the American National Standards Institute (ANSI), or the International Standards Organization (ISO). In one preferred embodiment of the present invention, the transaction sets conform to the ANSI Accredited Standards Committee (ASC) X12, the committee that develops and maintains generic requirements for EDI in the United States.

The electronic reseller notification transaction set is used to convey advance notice of a change of local service provider, confirmation when that change is completed, and notice if the planned change is cancelled. This transaction set is referred to as a contract award by ANSI.

The purchase order transaction set (850) may be used to provide for customary and established business and industry practice relative to the placement of purchase orders for telecommunications goods and services. For example, the reseller would use this transaction set to request telecommunications services from the wholesaler. Preferably, the purchase order is used to request any of the following types of services, each based on unique transaction identifiers contained within the transaction set: telephone number inquiries, reservations, reservation cancellations, and reservation confirmations; due date inquiries, reservations, reservation cancellations, and reservation confirmations; customer service record requests; and service requests.

The purchase order acknowledgment transaction set (855) is preferably used as an acknowledgment from the wholesaler to the reseller. This transaction set provides scheduling information, telephone and circuit number information, and the like, in response to receipt of a purchase order transaction (850) for one of the transactions identified above. Purchase order changes are preferably communicated using the Purchase Order Change Request—Buyer Initiated transaction set (860). For example, the reseller would use this transaction set to request a change to a previously submitted purchase order.

The Text Message transaction set (864) is intended to provide electronic communication for people, not necessarily for computer processing as with the other transaction sets. The use of this transaction set requires that the sender have certain detailed information about the recipient in some human-readable form. The recipient's network dictates the available capabilities for delivery of the information contained within the transaction. It is the responsibility of the sender to obtain this information and include it in the transmission. This transaction set may be used to respond to a customer service record request to provide information about an existing customer of the wholesaler to the reseller.

The Purchase Order Change Acknowledgment transaction set (865) is used to convey acceptance or rejection of changes to a previously submitted purchase order by the wholesaler or to notify the reseller of changes initiated by the wholesaler to a previously submitted purchase order by the wholesaler.

The reseller order status transaction set may be used to convey jeopardies which occur on an order after the 855 transaction set has been communicated. This transaction set may be used to provide status on individual line items of a purchase order or on the entire order.

The Functional Acknowledgment transaction set (997) is used to define the control structures for a set of acknowledgments to indicate the results of the syntactical analysis of the electronically encoded documents using other transaction sets. This transaction set includes data segments used to identify which electronic document (transaction set) contains an error and where the error occurred within the document.

Figure 2:
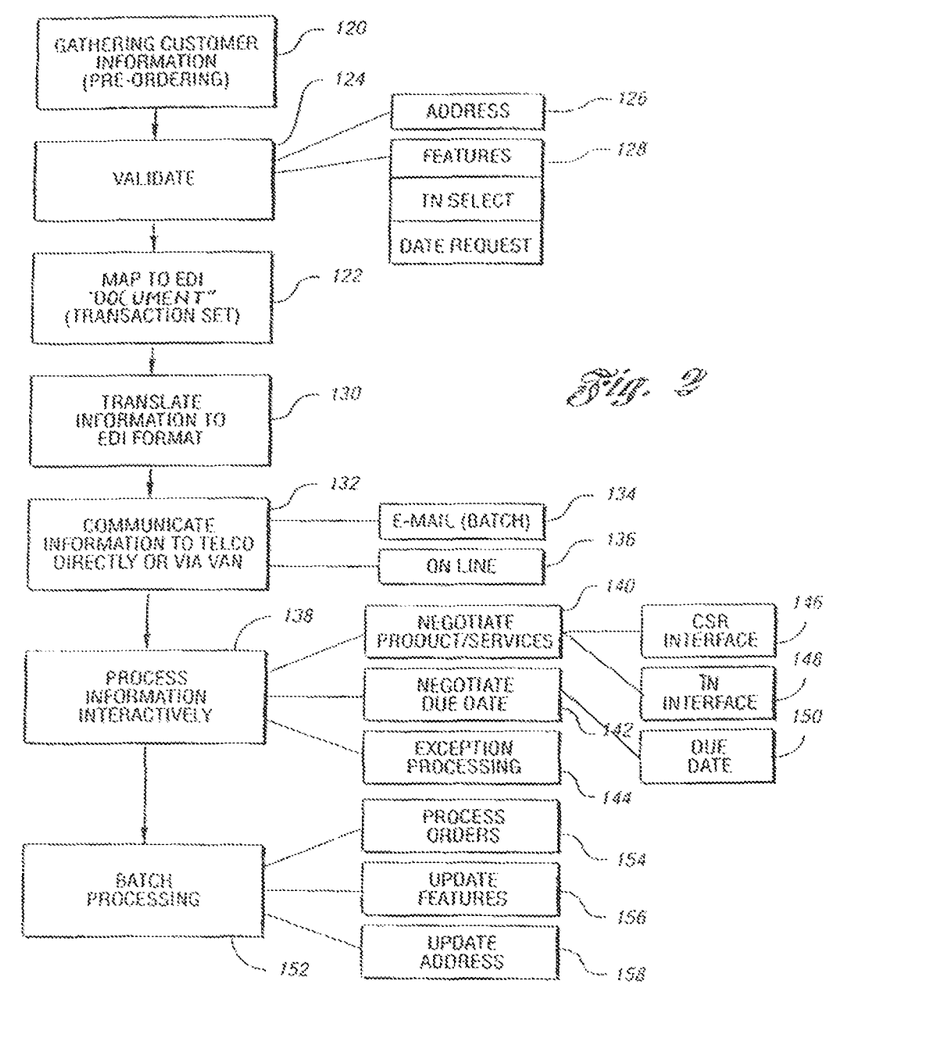
FIG. 2 is a flow chart illustrating one embodiment of a process for automated electronic ordering of telecommunication products and/or services according to the present invention.

FIG. 2 is a flow chart illustrating one embodiment of a process for automated electronic ordering of telecommunication products and/or services according to the present invention. As will be appreciated by one of ordinary skill in the art, the various steps, tasks, or functions illustrated are not necessarily sequential in nature. As such, the present invention is generally independent of the particular sequence or order in which the tasks or steps are completed. Various steps, tasks, or functions may be completed simultaneously, virtually simultaneously, or may be separated by minutes, hours, or days without departing from the spirit or scope of the present invention. Preferably, the present invention performs automatic electronic ordering of telecommunications using computer-to-computer communications exclusively, meaning that no human intervention is required to reduce or eliminate keying errors, mishandled or lost forms, and the like. However, the present invention incorporates exception processing which may include some level of human intervention to process unique or as yet undefined transactions.

The functions, steps, or tasks illustrated in the figures are preferably performed by a programmed microprocessor executing instructions stored in or on a computer readable storage medium. One of ordinary skill in this art will recognize that the functions, steps, or tasks are independent of the particular type of instruction set, storage medium, microprocessor, or processing strategy and may be performed by software, hardware, integrated circuits, firmware, microcode, and the like, operating alone or in combination. Likewise, processing strategies may include multi-processing, multi-tasking, parallel processing, and the like without departing from the spirit or scope of the present invention. Computer readable storage media may include various types of volatile and non-volatile storage media including but not limited to random access memory (RAM), read-only memory (ROM), programmable read-only memory (PROM), electrically programmable read-only memory (EPROM), electrically erasable read-only memory (EEPROM), flash memory, magnetic tape or disk, optical media, and the like.

Block 120 of FIG. 2 represents gathering customer information during a pre-ordering process. This is typically performed by the reseller in response to a customer inquiry or request for a service. However, this step may also be initiated by the reseller or wholesaler under particular circumstances, such as in the event of termination of service for non-payment, area code changes, feature availability changes, and the like. For a representative transaction, the reseller gathers appropriate information, depending upon the particular telecommunications service or product. The resellers use internal computing systems, such as computers 72, and/or databases to collect the appropriate items which constitute a particular transaction set for an electronic exchange of information. However, the information necessary for a particular transaction set may be scattered about various fields and/or databases depending upon the particular reseller's implementation. As such, the information or data is collected or mapped to a particular transaction set to form an electronic "document" as indicated by reference numeral 122.

The gathered information is validated as represented by block 124 using an address validation file 126 (illustrated and described with reference to FIG. 4) and a feature availability file 128 (illustrated and described with reference to FIGS. 5-6).

The information is translated into a standard EDI format as represented by block 130. Likewise, block 130 represents the reciprocal function of translating an EDI transaction received by the reseller back to the reseller's internal format. The translation function 130 allows the reseller to format the data conveniently for the customer service representatives rather than being forced to conform to the pre-defined EDI format. Automatic translation according to the present invention reduces or eliminates human intervention to transfer the data contained in an EDI transaction into the reseller's internal forms and format. However, the standardized EDI format allows the reseller and/or wholesaler to conduct business with other wholesalers and resellers who conform to the standard, respectively.

Once validated, the information is communicated from the reseller to the wholesaler (or vice versa) as represented by block 132. This may be accomplished using a dedicated or direct connection between the reseller and the wholesaler, or by using a VAN as described above. While this communication may be completed in a batch mode 134, it is preferably communicated using a TCP/IP socket connection during an interactive, substantially real-time session, i.e., while the reseller is "on-line" as represented by reference numeral 136. While batch processing may be used to take advantage of lower volume traffic during off-peak times, it delays processing and reduces efficiency, especially if any errors are present in the electronic data, regardless of their source.

The information communicated to the wholesaler is processed by the message server, preferably interactively as indicated by block 138. This processing may include negotiating products and services 140, negotiating due dates 142, and exception processing 144. Preferably, the processing by the wholesaler is facilitated by a customer service record interface 146, a telephone number interface 148, and a due date interface 150. These interfaces are illustrated and described in detail with reference to FIGS. 7-9, respectively.

Batch processing, represented by block 152, may include processing orders 154, in addition to transferring files to update feature availability, represented by block 156, and to update the address validation file, represented by block 158. In one preferred embodiment of the present invention, a commercial electronic file transfer program is used to transfer the address and feature availability files such as the Connect Direct software available from Sterling Software of Texas.

Figure 3:
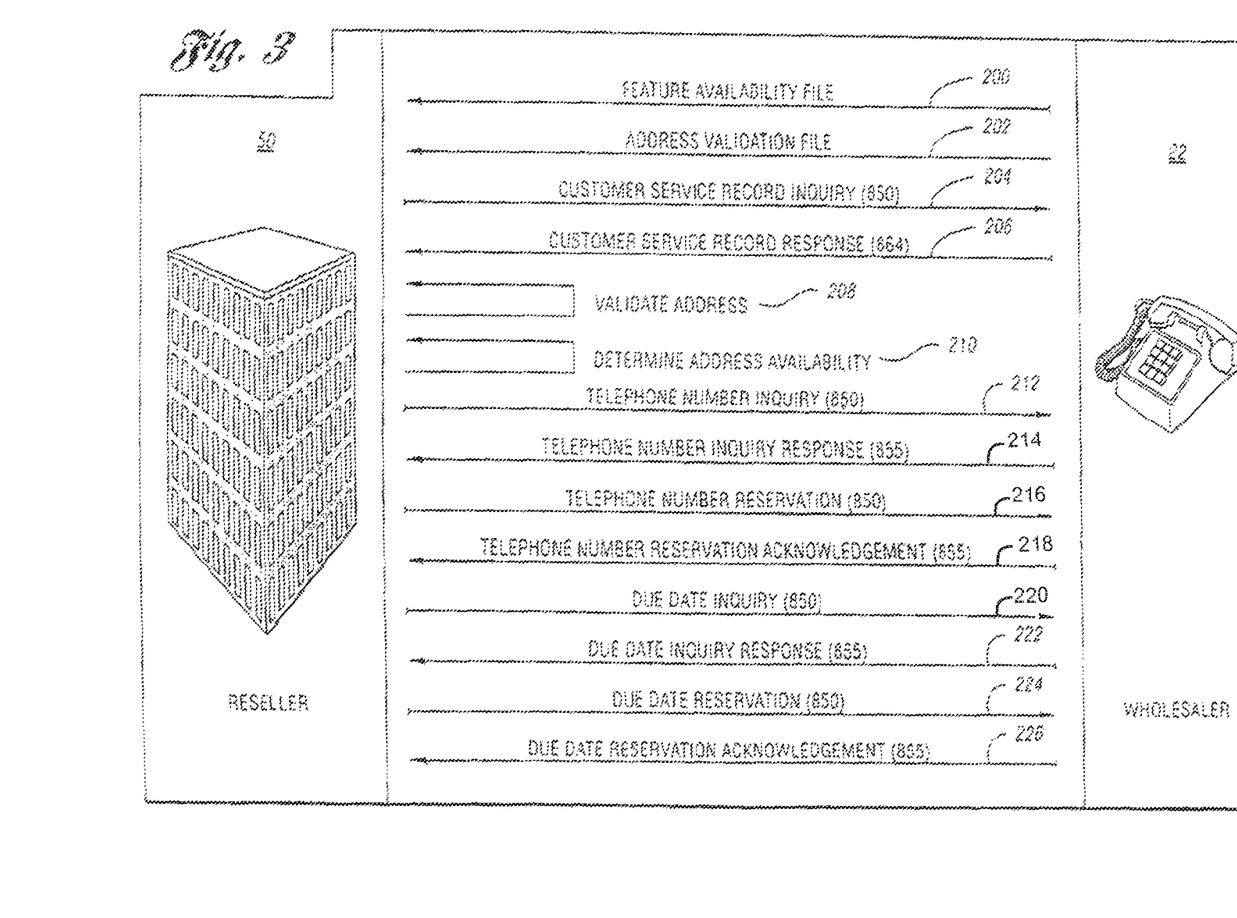
FIG. 3 is a transaction flow diagram illustrating a pre-ordering exchange between a telecommunications provider and a telecommunications reseller as implemented in one embodiment of the present invention.

FIG. 3 is a transaction flow diagram illustrating a pre-ordering exchange between a telecommunications provider and a telecommunications reseller as implemented in one embodiment of the present invention. Once a relationship has been established between reseller 50 and wholesaler 22, reseller 50 receives regular transmissions of a feature availability file 200 and address validation file 202 for subsequent use in processing customer orders. When reseller 50 receives an order or inquiry from a customer, reseller 50 initiates an electronic request for customer service record information and transmits the request to wholesaler 22 using either the purchaser order transaction set (850) as indicated by reference numeral 204. If the customer service record request has appropriate authorization, the corresponding customer service record is forwarded to the reseller using the customer service record response transaction set (864) as indicated by reference numeral 206.

Reseller 50 uses the feature availability file and address validation file which was previously transmitted to verify the availability of the requested feature for a particular address and to authenticate or validate the address as indicated at reference numerals 208 and 210. As part of the same transaction, or as part of a separate transaction, a telephone number inquiry may be initiated by reseller 50 and sent to wholesaler 22 using purchase order transaction set (850) with a transaction code of T10, for example, as indicated by reference numeral 212. Wholesaler 22 generates a response using purchase order acknowledgment transaction set (855) as indicated by reference numeral 214. A telephone number reservation may then be initiated by reseller 50 and transmitted to wholesaler 22 using purchase order transaction set (850) with a transaction code or type of T20 as indicated by reference numeral 216. In response, wholesaler 22 confirms the telephone number reservation to reseller 50 using purchase order acknowledgment transaction set (855) as indicated by reference numeral 218.

A due date inquiry, initiated by reseller 50 is sent to wholesaler 22 using purchase order transaction set (850) with a transaction type of R10 as indicated by reference numeral 220. Wholesaler 22 responds using purchase order acknowledgment transaction set (855) as indicated by reference numeral 222. This is followed by a due date reservation initiated by reseller 50 and forwarded to wholesaler 22 using purchase order transaction set (850) indicating a transaction type of R20 as indicated by reference numeral 224. The purchase order acknowledgment transaction set (855) is again used to confirm the due date reservation as indicated by reference numeral 226.

Various other transaction pairs utilizing the purchase order transaction set (850) and purchase order acknowledgment transaction set (855) may also be exchanged. For example, a telephone number reservation cancellation may be initiated by reseller 50 and then confirmed by wholesaler 22. Likewise, a telephone number reservation inquiry may be initiated by reseller 50 with an appropriate transaction code or type, such as T40 and confirmed by wholesaler 22 when appropriate. In a similar fashion, due date reservation cancellations and confirmations may be initiated and confirmed by reseller 50 and wholesaler 22, respectively.

Figures 4, 5:
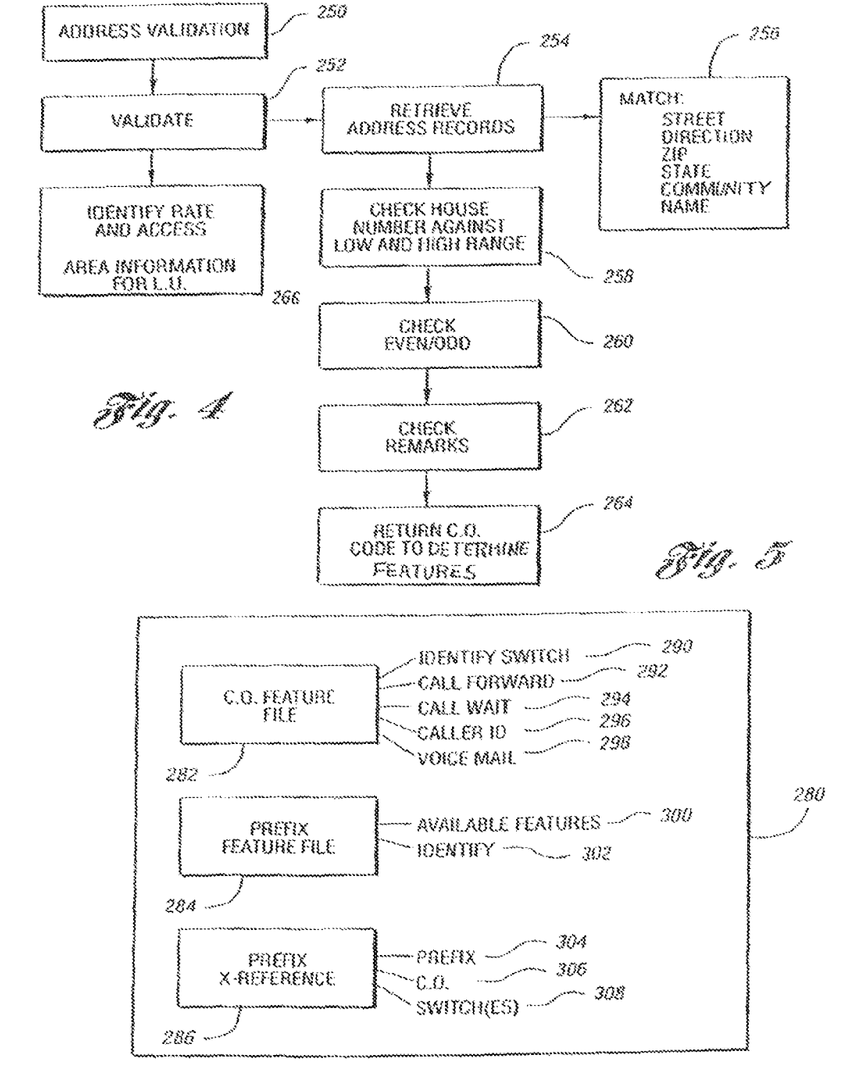
FIG. 4 is a block diagram illustrating one embodiment of an address validation interface for automated electronic telecommunications ordering according to the present invention.
FIG. 5 is a block diagram illustrating one embodiment of a feature availability file for automated electronic telecommunications ordering according to the present invention.

FIG. 4 is a block diagram illustrating one embodiment of an address-validation interface for automated electronic telecommunications ordering according to the present invention. Address validation interface 250 provides regular address validation information updates from the wholesaler to the reseller. Preferably, the reseller is provided with a text file having fixed length fields for a particular geographic area, such as one address file for each state. This allows the reseller to determine which central office (CO) services a particular customer's address or Living Unit (LU). This information is validated as represented by block 252.

Using the address information provided by the customer and transmitted by the reseller, each set of address records is retrieved from the address file as represented by block 254. Each set of records is selected by matching one or more of the data fields including street, direction, zip code, state, and community name, as represented by block 256. The house or building number is compared to determine whether it is within a valid range for the particular street and direction as represented by block 258. Subsequently, an odd/even check may be performed where appropriate as represented by block 260. Any remarks which may provide additional information to be submitted on the service order are represented by block 262. The system determines a unique central office code corresponding to the address information to identify the particular central office which services that address as represented by block 264. This information is then used to identify a rate band and access area information for the customer's address as represented by block 266.

FIG. 5 is a block diagram illustrating one embodiment of a feature availability file for automated electronic telecommunications ordering according to the present invention. In a preferred embodiment, feature availability interface 280 provides regular feature availability information updates to resellers from the wholesalers as described above. In this embodiment, the reseller is provided with three types of text files having fixed length fields including a central office feature file 282, a prefix feature file 284, and a prefix cross-reference file 286. Preferably, each geographic region, such as a state, has associated feature files 282, 284, and 286.

Central office feature file 282 contains feature information for each central office in a particular area code and one or more exchanges. Where a central office includes more than one switch, central office feature file 282 contains information about which switch provides each feature as represented by reference numeral 290. Feature file 282 may include information relative to features such as remote access call forwarding 292, call waiting 294, caller ID 296 and voicemail 298. Preferably, data elements within feature file 282 include the Numbering Plan Area (NPA), commonly known as the area code, the exchange which serves the customer, the central office code, the date on which the most recent changes became effective, the feature Universal Service Ordering Code (USOC), the switch identification, a feature exception indicator, an additional exception indicator, and a call-waiting exception indicator.

Prefix feature file 284 preferably contains feature information 300 for each prefix within the NPA, while also identifying the central office that the prefix belongs to as represented by reference numeral 302. In one preferred embodiment, prefix file 284 includes data fields for the NPA, exchange, central office ID, prefix, the date on which the most recent changes became effective, and indicators for: exception call-waiting, remote access call forwarding, feature exception, additional exceptions, and the USOC.

Prefix cross-reference file 286 preferably provides a cross-reference between the prefix 304 and central office 306 containing the prefix in addition to the switches 308 which service the prefix. The information in this file is not required for standard processing of a customer order, unless specific prefixes are requested.

Figure 6:
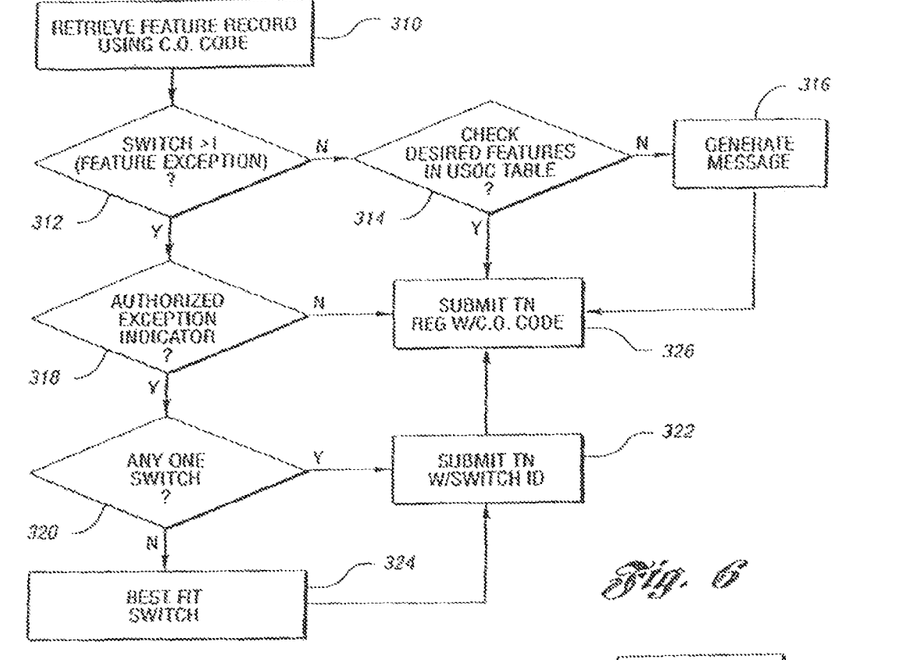
FIG. 6 is a flow chart illustrating one embodiment for feature availability processing for automated electronic telecommunications ordering according to the present invention.

FIG. 6 is a flow chart illustrating one embodiment for feature availability processing for automated electronic telecommunications ordering according to the present invention. This process is preferably used in determining available features in a particular CO as well as determining switch identification for COs serviced by more than one switch. When necessary, the CO code or switch identification may be used in a telephone number request. Using the CO code retrieved from the address validation process described above, the system retrieves the feature record from the central office feature file by matching with the central office field as represented by block 310. The feature exception indicator is examined to determine whether the particular CO is serviced by more than one switch as represented by block 312. If the CO is not serviced by more than one switch with differing features, the USOC table will contain all of the available features for that particular CO. Using this list, the system verifies that the requested features are available within the identified CO as represented by block 314. If any feature is not available, an appropriate message may be generated, as represented by block 316, before submitting the request for a telephone number using the CO code as represented by block 326.

If the CO is serviced by more than one switch with varying features as determined by block 312, then the additional exception indicator field is examined as represented by block 318. If none of the desired features contain an appropriate code in the additional exception indicator field, the desired features are available for all switches within the CO so the telephone number request is submitted with the CO code as represented by block 326. If any of the desired features do contain an appropriate code in the additional exception indicator field, not all of the desired features are available in each switch servicing the CO. In this case, the USOC table is examined to determine if all of the desired features are provided by any one switch as represented by block 320. If any one switch provides all of the desired features, then the switch ID is added to the telephone number request as represented by block 322.

If all of the desired features are not provided by any one switch, all of the requirements will not be able to be met and the system (or a service representative) must select the switch which provides either the greatest number of features, or the most important features, as represented by block 324. For this process, each feature may be assigned a code indicating its relative importance. The code may be determined by the reseller, the wholesaler, or the ultimate customer depending upon the particular application. The switch ID which satisfies a greater number of selection criteria is then added to the telephone number request as represented by block 322. The telephone number request is then submitted with the CO code and the switch ID (where appropriate) as represented by block 326.

Using the feature availability interface in an interactive mode, the telecommunications reseller can ensure that the desired features are available for the serving CO retrieved through the address validation process. Where the CO serving the customer includes more than one switch, the feature availability interface determines the switch which contains the desired features, or selects the switch which contains the most features based on quantity or importance. The reseller can use the various feature files to determine all of the areas in which a particular feature is offered, determine which features are offered for a particular prefix (exchange), and determine valid prefixes for a particular CO.

Figure 7:
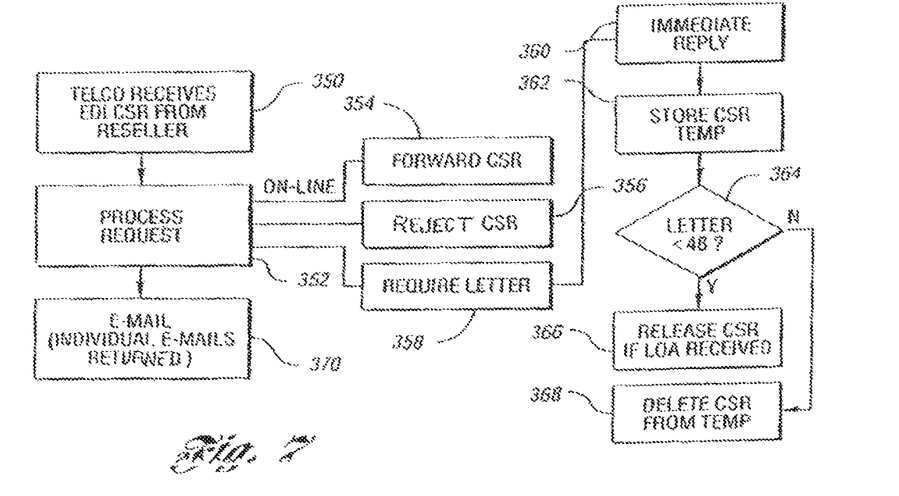
FIG. 7 is a block diagram illustrating one embodiment of a Customer Service Record (CSR) interface for automated electronic telecommunications ordering according to the present invention.

FIG. 7 is a block diagram illustrating one embodiment of a Customer Service Record (CSR) interface for automated electronic telecommunications ordering according to the present invention. The CSR provides the reseller with on-line customer service records. The reseller obtains customer account information by submitting EDI transactions and receiving EDI responses. The reseller transmits a request for a Customer Service Record using the appropriate transaction set (preferably 850—ASCX12 version 003030) which is received by the wholesaler as represented by block 350. The wholesaler processes the request as represented by block 352 and generates one of three responses represented by blocks 354, 356, and 358. Preferably, the responses are returned using a different transaction set, such as the 864—ASCX2 version 003030.

Typically, the request will result in forwarding of the appropriate CSR to the reseller as represented by block 354. However, the request may be rejected with an appropriate message as represented by block 356. For some transactions, a letter of authorization is required as represented by block 358. If the transaction requires a letter of authorization, exception processing is performed by the wholesaler as represented by blocks 360-368. An immediate reply is generated using the appropriate transaction set (preferably 864) and forwarded to the reseller to indicate that a letter of authorization is required as represented by block 360. The appropriate CSR is then held in temporary storage as represented by block 362 for a predetermined time, preferably about 48 hours, as represented by block 364. If a letter of authorization is received within the predetermined time period, the CSR is released to the reseller as represented by block 366. Otherwise, the CSR is deleted from temporary storage as represented by block 368.

In one preferred embodiment of the present invention, the CSR interface also accommodates requests received by E-mail. Resellers can send CSR data requests to the wholesaler and receive either the desired CSR or error messages in return. The CSR data and error messages have a text format and are meant to be read by people rather than computers. In this embodiment, the CSR interface uses the Flexible Communication Interface Format (FCIF) developed by Bellcore. This format uses a tag value methodology. Each request starts with an asterisk (*) followed by a code indicating the type of request. Braces ({ }) are used to enclose pairs of tag values and associated ASCII characters which provide the value for each data element. Data elements are separated by a semicolon. The percent sign (%) is used to denote the end of a request. Several CSR requests can be made within one e-mail by incorporating them into the text of a single e-mail message. However, each request is returned separately to avoid any negative impact on the e-mail network. Likewise, if the retrieved CSR data is particularly sizable, a response is sent indicating that the CSR has been retrieved but will be delayed for off-peak delivery.

Figure 8:
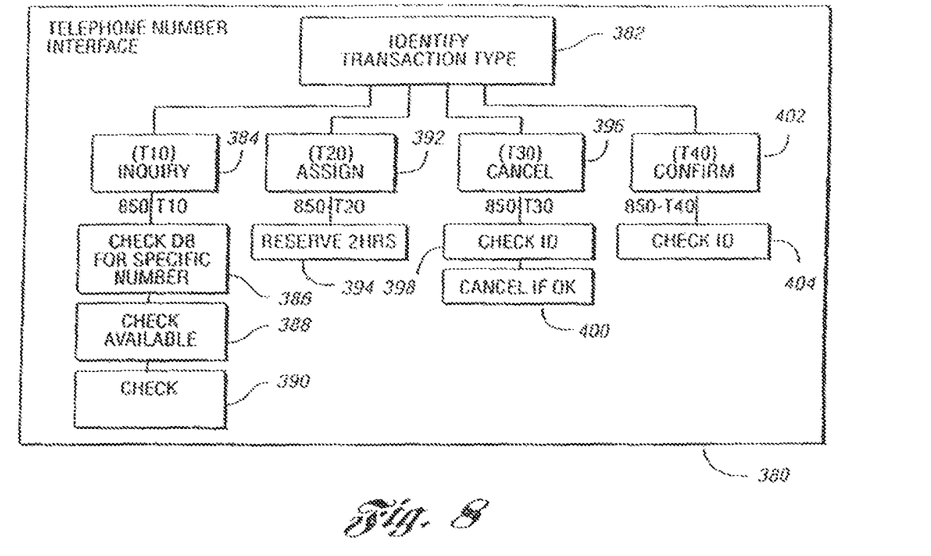
FIG. 8 is a block diagram illustrating one embodiment of a telephone number interface for automated electronic telecommunications ordering according to the present invention.

FIG. 8 is a block diagram illustrating one embodiment of a telephone number interface for automated electronic telecommunications ordering according to the present invention. Telephone number interface 380 provides interactive, on-line telephone number inquiry and reservation features to the reseller. In one embodiment of the present invention, four transactions are provided and handled on a real-time basis. Communications between the reseller and wholesaler are preferably based on EDI message formats with 850—ASCX12 version 003030 used for submissions by the reseller and 855—ASCX12 version 003030 used for responses from the wholesaler.

A telephone number inquiry as represented by block 384 may be submitted as a Purchase Order (850) with a transaction type of T10. The corresponding response is issued as a Purchase Order Acknowledgment (855). The telephone number inquiry 384 may be used to determine the availability of a specific telephone number. Given a specific telephone number, the system will respond with a message indicating whether or not the telephone number is available as represented by block 386. Given a particular NPA and prefix, the system will return a predetermined or requested number of available telephone numbers as represented by block 388. Given a preferred telephone number pattern, the system will attempt to match the available numbers to the requested pattern and return a list of available numbers that match the desired pattern as represented by block 390. The telephone number inquiry does not reserve telephone numbers for subsequent use in a service order. A separate transaction must be submitted to guarantee that the number will be held for a requester's service order as explained in greater detail below.

Telephone number interface 380 may also be used to assign a telephone number for use by a reseller in subsequent order processing as represented by block 392. This transaction is submitted as a purchase order with a transaction type of T20. The response is issued using the purchase order acknowledgment transaction set. Upon receipt of the telephone number assignment transaction, the telephone number is reserved for a certain period of time as represented by block 394. In one embodiment of the present invention, the period of time is two hours. If a service order is not received within the predetermined time interval, the reservation is canceled and the telephone number will be returned to the available telephone number pool for use by other resellers and representatives.

A telephone number assignment cancellation request, represented by block 396, is submitted using the purchase order transaction set with a transaction type of T30. The response from the wholesaler to the reseller is issued using the purchase order acknowledgment transaction set. Upon receipt, the system determines whether the request came from the same reseller that initially reserved the telephone number as represented by block 398. If the reseller ID matches, the reservation is cancelled as represented by block 400 and the previously assigned telephone number is returned to the pool of available telephone numbers. Each request cancels only one telephone number reservation. Multiple telephone number requests are preferably not allowed.

A telephone number assignment confirmation is transmitted using the purchase order transaction set with a transaction type of T40 as represented by block 402. The response is issued using the purchase order acknowledgment transaction set. This request is used to confirm that a telephone number is still assigned to a particular reseller. Confirmations for telephone number assignments can be made only by the reseller making the initial reservation. As such, the reseller identification code is checked against the previously submitted assignment as represented by block 404.

Figure 9:
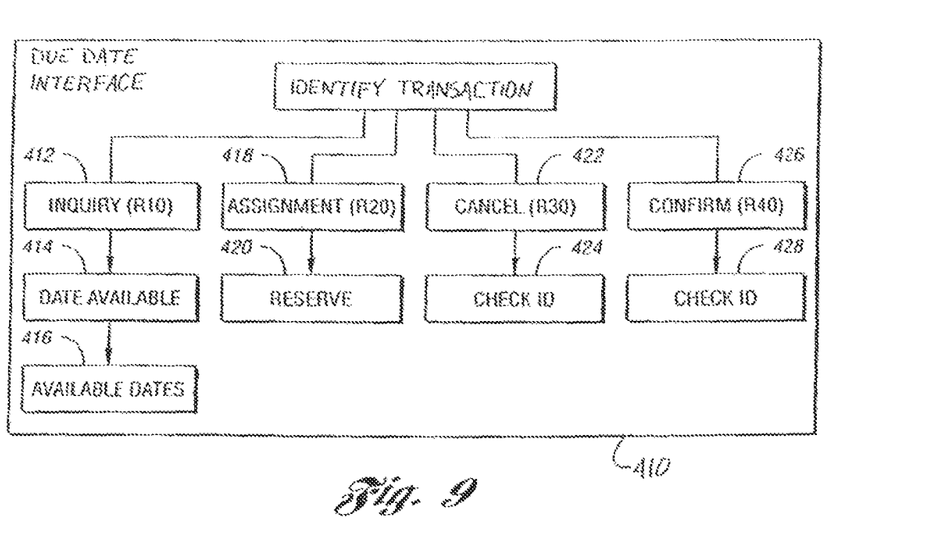
FIG. 9 is a block diagram illustrating one embodiment of a due date interface for automated electronic telecommunications ordering according to the present invention.

FIG. 9 is a block diagram illustrating one embodiment of a due date interface for automated electronic telecommunications ordering according to the present invention. Due date interface 410 provides on-line due date inquiry and reservation features. In one preferred embodiment of the present invention, due date interface 410 provides four transactions which are handled on a real-time basis. Preferably, all transactions are submitted using the purchase order transaction set (850—ASCX12 version 003030) with responses from the wholesaler using the purchase order acknowledgment transaction set (855—ASCCX12 version 003030).

A due date inquiry is submitted with a transaction type of R10 as represented by block 412. This transaction may be used to determine the availability of a specific due date as represented by block 414. Given a requested due date, the system will respond by indicating whether or not the due date is available and can be met based on the required service order activity. A due date inquiry may also be used to obtain a list of available due dates when a premises visit is required as represented by block 416. Given a description of the requested service order activity, the system provides the earliest possible due date in addition to a list of other available due dates. The due date inquiry does not reserve due dates for subsequent use in a service order. A separate due date assignment transaction 418 must be submitted to guarantee that the due date will be held for a particular service order.

Due date assignment transaction 418 is submitted using the purchase order transaction set with a transaction type of R20. A response is issued using the purchase order acknowledgment transaction set. Due date transaction 418 allows the reseller to reserve a specific due date for use in subsequent order processing as represented by block 420. This transaction contains the same information as the inquire transaction 412 with the exception that the reseller submits a specific due date and a time-of-day preference, such as morning, afternoon, or all day. A due date assignment may be attempted without a previously submitted due date inquiry.

Upon receipt of a due date assignment transaction 418, the due date is reserved for a predetermined period of time, such as two hours, as represented by block 420. The reseller must submit a service order for the reserved due date within this time period or the reservation is automatically canceled. All requested products and services should be accurately represented on a due date assignment transaction. If the subsequently submitted service order contains information different from the due date assignment which impacts the due date, the service order may be rejected.

A due date assignment cancellation transaction 422 is submitted by the reseller as a purchase order using transaction set 850 with a transaction type of R30. A response is issued using the purchase order acknowledgment. This transaction is used to cancel a previously assigned due date. The reseller identification is checked against the previously submitted due date assignment transaction as represented by block 424 so that only the reseller who initially made the assignment may submit a cancellation request for that assignment. Each due date assignment cancellation transaction cancels exactly one due date reservation. Multiple due date cancellations in one transaction are preferably not permitted.

A due date assignment confirmation transaction 426 is submitted by the reseller using the purchase order transaction set with a transaction type of R40. A response is generated by the wholesaler using the purchase order acknowledgment transaction set. This transaction is used to confirm that a due date is still in assigned status. The identification of the reseller is compared against the previously submitted assignment transaction as represented by block 428. Confirmations of due date assignments are preferably only permitted for the reseller who made the initial reservation.

Figure 10:
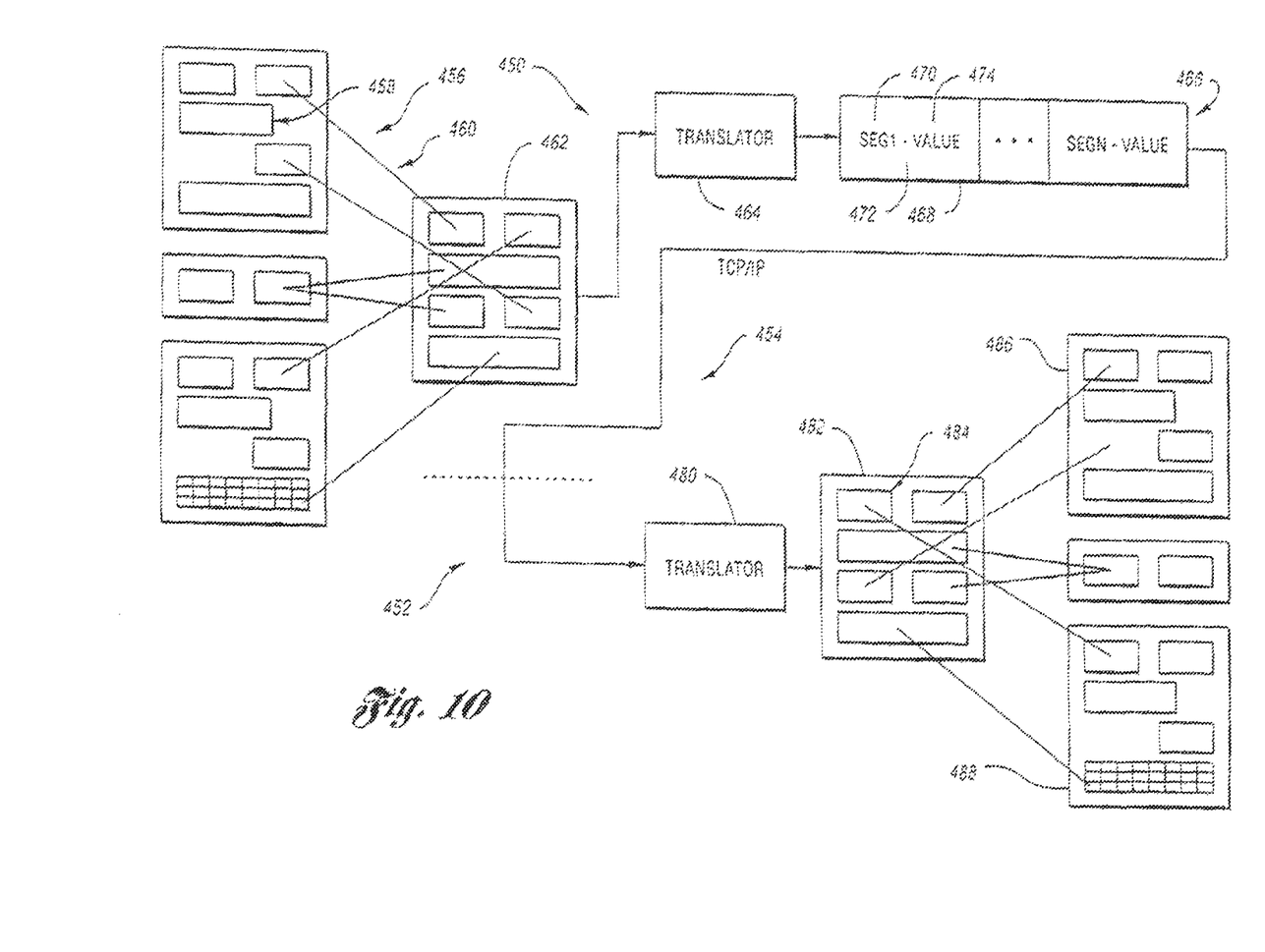
FIG. 10 is a block diagram illustrating mapping and translation functions of one embodiment for automated electronic telecommunications ordering according to the present invention.

FIG. 10 is a block diagram illustrating mapping and translation functions of one embodiment for automated electronic telecommunications ordering according to the present invention. The mapping and translation functions being performed by the reseller, indicated generally by reference numeral 450, cooperate with similar mapping and translation functions of the wholesaler, indicated generally by reference numeral 452, preferably using a TCP/IP connection, indicated by reference numeral 454. Preferably, the mapping and translation functions are performed by software executing on one or more computers, such as the customer service agent computers and message servers described and illustrated with reference to FIG. 1.

The data gathered by the reseller is entered into one or more databases or forms 456 which include various data fields 458. Forms 456 preferably represent various data entry screens on a computer operated by a customer service representative. A mapping function is performed as indicated generally by reference numeral 460 to collect the information related to a particular electronic "document" 462. A translator 464, also implemented in software, translates the data from electronic document 462 into an electronic message 466 using a standard transaction set. Message 466 includes several segments 468 each having a segment identifier 470, a data segment identifier 472, and a data segment value 474. In one preferred embodiment of the present invention, the segments of a transaction set must occur in a particular sequence for proper processing. A single electronic message 466 may contain multiple electronic documents 462 which are concatenated in a single data stream. Additional information is added to electronic message 466 for transmission via the TCP/IP link 454 to the wholesaler, such as routing information, error detection information, and the like, as well known in the art.

An analogous reciprocal process occurs when the message reaches the wholesaler 452. Translator 480 parses electronic message 466 to identify one or more transaction sets. Message syntax is examined and error messages are generated when appropriate. The received data is temporarily stored in electronic document 482 having data fields 484. The appropriate information is then automatically transferred to the wholesaler's internal order system as represented by blocks 486 and 488. The order is processed and a response is generated, translated using the standard transaction set, and transmitted to the reseller. By reducing manual intervention, this system reduces operating expenses and increases accuracy. Furthermore, a real-time response is generated and communicated to reduce turn-around time.

While the best mode for carrying out the invention has been described in detail, those familiar with the art to which this invention relates will recognize various alternative designs and embodiments for practicing the invention as defined by the following claims.

The invention claimed is:

1. A method for processing orders for telecommunications services, the method comprising:
    receiving, at a processor, an electronic order requesting a telecommunications service, the electronic order comprising a due date and a time-of-day preference for the telecommunications service;
    in response to receiving the electronic order, providing, by the processor, an electronic response, wherein the electronic order comprises a first transaction set of an electronic data interchange standard and the electronic response comprises a second transaction set of the electronic data interchange standard;
    reserving, by the processor, the due date for an amount of time in response to receiving the electronic order; and
    determining, by the processor, whether a service order for performance of the telecommunications service on the due date is received during the amount of time.

2. The method of claim 1, further comprising canceling, by the processor, a reservation of the due date if a service order is not received during the amount of time.

3. The method of claim 1, further comprising:
    receiving the service order for performance of the telecommunications service on the due date;
    determining whether the service order contains information different from the electronic order; and
    if the service order contains information different from the electronic order, rejecting the service order.

4. The method of claim 1, further comprising receiving, at the processor, a cancellation request associated with the due date reserved.

5. The method of claim 4, further comprising:
    comparing, by the processor, a requester associated with the electronic order with a requester associated with the cancellation request; and
    if the requester associated with the electronic order matches the requester associated with the cancellation request, then canceling, by the processor, a reservation of the due date.

6. The method of claim 4, further comprising receiving, at the processor, an assignment request to confirm a status of the due date.

7. The method of claim 6, further comprising
    comparing, by the processor, a requester associated with the electronic order with a requester associated with the cancellation request; and
    if the requester associated with the electronic order matches the requester associated with the assignment request, then confirming, by the processor, the status of the due date in response to the assignment request.

8. A non-transitory computer-readable storage medium having computer-executable instructions stored thereon that, when executed by a computer, cause the computer to perform operations comprising:
    receiving an electronic order requesting a telecommunications service, the electronic order comprising a due date and a time-of-day preference for the telecommunications service;
    in response to receiving the electronic order an electronic response, wherein the electronic order comprises a first transaction set of an electronic data interchange standard and the electronic response comprises a second transaction set of the electronic data interchange standard;

reserving the due date for an amount of time in response to receiving the electronic order; and determining whether a service order for performance of the telecommunications service on the due date is received during the amount of time.

9. The non-transitory computer-readable storage medium of claim 8, wherein the operations further comprise canceling a reservation of the due date if a service order is not received during the amount of time.

10. The non-transitory computer-readable storage medium of claim 8, wherein the operations further comprise receiving a cancellation request associated with the due date reserved.

11. The non-transitory computer-readable storage medium of claim 10, wherein the operations further comprise:

comparing a requester associated with the electronic order with a requester associated with the cancellation request; and if the requester associated with the electronic order matches the requester associated with the cancellation request, then canceling a reservation of the due date.

12. The non-transitory computer-readable storage medium of claim 10, wherein the operations further comprise receiving an assignment request to confirm a status of the due date.

13. The non-transitory computer-readable storage medium of claim 12, wherein the operations further comprise:

comparing a requester associated with the electronic order with a requester associated with the cancellation request; and if the requester associated with the electronic order matches the requester associated with the assignment request, then confirming the status of the due date in response to the assignment request.

14. A system for processing orders for telecommunications services, the system comprising:

a processor; and a memory that stores a program containing computer-executable instructions that, when executed by the processor, cause the processor to perform operations comprising:

receiving an electronic order requesting a telecommunications service, the electronic order comprising a due date and a time-of-day preference for the telecommunications service, in response to receiving the electronic order an electronic response, wherein the electronic order comprises a first transaction set of an electronic data interchange standard and the electronic response comprises a second transaction set of the electronic data interchange standard, reserving the due date for an amount of time in response to receiving the electronic order, and determining whether a service order for performance of the telecommunications service on the due date is received during the amount of time.

15. The system of claim 14, wherein the operations further comprise canceling a reservation of the due date if a service order is not received during the amount of time.

16. The system of claim 14, wherein the operations further comprise:

receiving the service order for performance of the telecommunications service on the due date;

determining whether the service order contains information different from the electronic order; and if the service order contains information different from the electronic order, rejecting the service order.

17. The system of claim 14, wherein the operations further comprise receiving a cancellation request associated with the due date reserved.

18. The system of claim 17, wherein the operations further comprise:

comparing a requester associated with the electronic order with a requester associated with the cancellation request; and if the requester associated with the electronic order matches the requester associated with the cancellation request, then canceling a reservation of the due date.

19. The system of claim 17, wherein the operations further comprise receiving an assignment request to confirm a status of the due date.

20. The system of claim 19, wherein the operations further comprise:

comparing a requester associated with the electronic order with a requester associated with the cancellation request; and if the requester associated with the electronic order matches the requester associated with the assignment request, then confirming the status of the due date in response to the assignment request.

* * * * *